Figure 1:
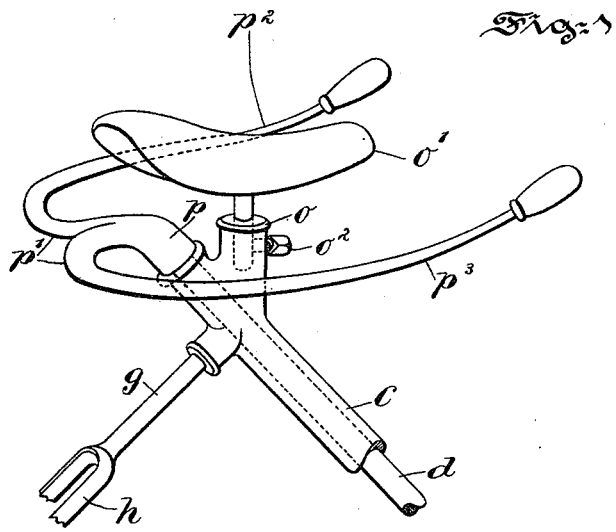

(No Model.) 2 Sheets—Sheet 1.

A. H. MACKINNON & S. M. GAGE.
BICYCLE.

No. 566,201. Patented Aug. 18, 1896.

Witnesses:
Richard E. Maxwell
Louis Winterberger

Inventors:
Alexander H. Mackinnon,
and Stuart M. Gage,
By J. Walter Douglas
Attorney.

THE NORRIS PETERS CO., PHOTO-LITHO., WASHINGTON, D. C.

(No Model.) 2 Sheets—Sheet 2.
A. H. MACKINNON & S. M. GAGE.
BICYCLE.
No. 566,201. Patented Aug. 18, 1896.
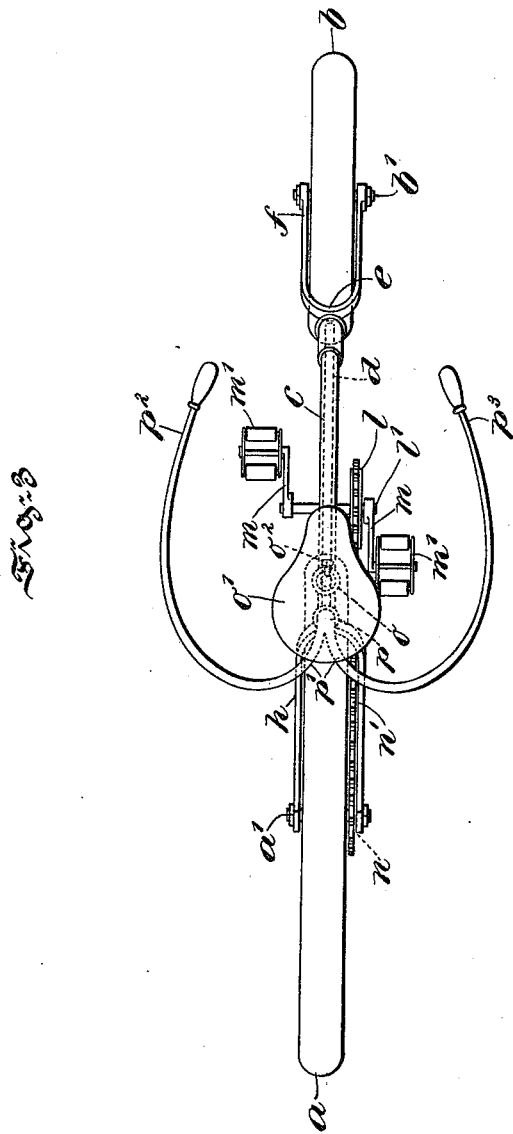

UNITED STATES PATENT OFFICE.

ALEXANDER H. MACKINNON AND STUART M. GAGE, OF SEATTLE, WASHINGTON.

BICYCLE.

SPECIFICATION forming part of Letters Patent No. 566,201, dated August 18, 1896.

Application filed January 30, 1895. Serial No. 536,741. (No model.)

*To all whom it may concern:*

Be it known that we, ALEXANDER H. MACKINNON and STUART M. GAGE, citizens of the United States, residing at the city of Seattle, in the county of King and State of Washington, have invented certain new and useful Improvements in Bicycles, of which the following is a specification.

Our invention has relation to bicycles or similar vehicles, and it relates more particularly to the general construction and arrangement thereof.

The principal objects of our invention are, first, to provide a simple, durable, and efficient two-wheeled vehicle; second, to provide a bicycle or the like with a triangular frame supporting a seat, driving and steering mechanism, and road-wheels, and said frame being of simple construction, light, and durable; third, to provide a bicycle or similar vehicle with a triangular frame as a support for road-wheels, a saddle-holder, and driving and steering mechanism and handle-bars connected with the shaft or rod of the pilot or steering wheel, movably connected with a member of the said frame, the said handle-bars formed from the point of beginning thereof into substantially the letter W, the arms of which are curved and extend forwardly and upwardly considerably in front of a saddle adjustably engaging said holder and slightly above or nearly in line therewith to partially encircle the thighs of the rider mounted on the saddle; fourth, to provide a bicycle or similar vehicle with a frame or backbone having a rod or shaft movably connected with one member of said frame and forked so as to engage the hub of one of said wheels, and at the opposite end with substantially W-shaped steering-handles, the arms of which are curved or sweep outwardly from the rear of a saddle to partially encircle the thighs of a rider seated on the saddle and so that no obstruction is presented in advance or front of the rider, and, further, so that, due to such arrangement of the handle-bars or arms, the vehicle may be adapted to receive a person of either sex, greater safety in the use of the same being insured.

Our invention, stated in general terms, consists of a bicycle or similar vehicle for performing the functions and attaining the said objects when constructed and arranged in substantially the manner hereinafter described and claimed.

The nature and general features of our invention will be more fully understood from the following description, taken in connection with the accompanying drawings, forming part hereof, and in which—

Figure 2:
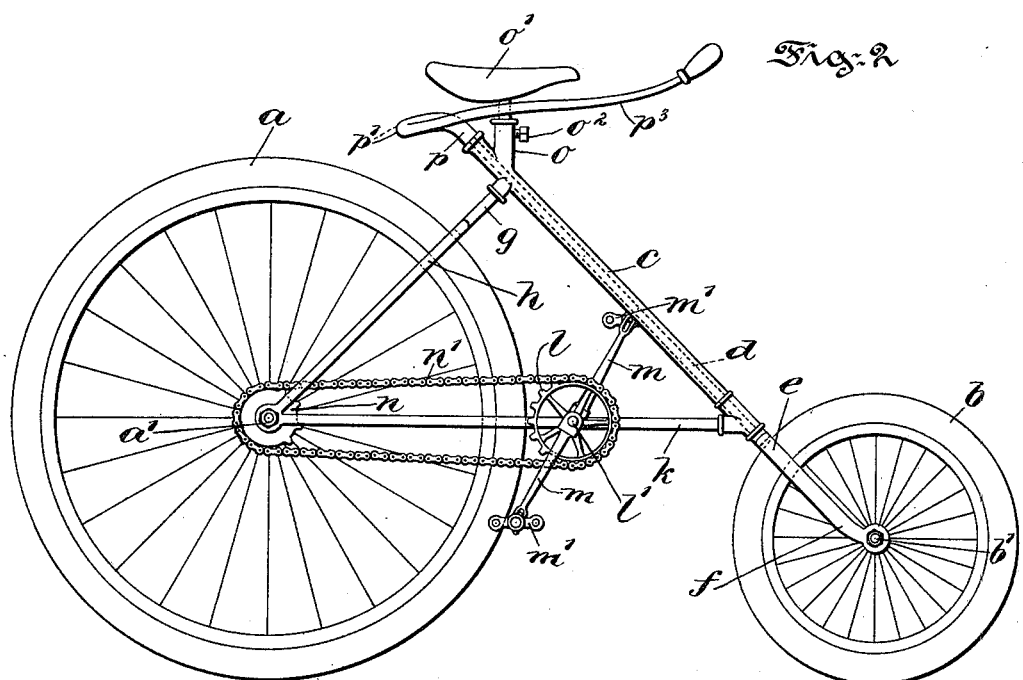

Figure 1 is a perspective view, enlarged, of a portion of the improved frame, the seat and its support, and the particular construction and arrangement of steering handles or bars of a bicycle or similar vehicle embodying characteristic features of our invention. Fig. 2 is a side elevational view of the improved bicycle or two-wheeled-vehicle frame and steering-handles of the same of our said invention; and Fig. 3 is a top or plan view of the vehicle, showing the particular arrangement of the steering-handles in operative position.

Referring to the drawings, $a$ is the rear or driving wheel, and $b$ the front, pilot, or steering wheel of the bicycle. The axles or hubs $a'$ and $b'$, respectively, of these wheels lie in different horizontal planes, the hub $b'$ of the front or steering wheel $b$ being lower and consequently the said wheel is smaller than the rear or driving wheel $a$. The main or forward standard $c$ of the triangular frame is inclined at an angle of approximately forty-five degrees (45°) to the perpendicular, and is hollow like a sleeve to receive and support a shaft $d$ of the forked steering-rod $e$, which supports and controls within its fork $f$ the wheel $b$ and its axle $b'$.

At approximately right angles to the forward standard $c$, and secured thereto in any suitable inflexible manner at preferably a point directly beneath the seat $o'$ or saddle-support $o$, extends the rear standard or support $g$ for the rear or driving wheel $a$. This rear standard $g$ is also forked, as at $h$, the fork encircling the rear wheel and supporting the axle thereof. From the lower forked ends $h$ to the front standard $c$ extends the horizontal or side standards $k$, preferably arranged parallel to the ground. These side standards $k$ converge and are jointed together at or in the forward standard, while they diverge at the rear standard to encircle the rear wheel $a$. Between the wheels and supported by the side standards is the axle $l'$ and main driving-sprocket $l$, said sprocket $l$ being actuated through its axle $l'$ by suitable cranks $m$ and pedals $m'$ in the usual well-known manner. The rear or driving wheel $a$ has upon its axle a sprocket $n$, connected by a sprocket-chain $n'$ with the sprocket $l$, as clearly illustrated in Fig. 2 of the drawings. The seat-support $o$ extends upward from the forward standard $c$. The seat $o'$ is adjustably secured in said support by means of a set-screw or the like $o^2$, and may be raised or lowered therein in any preferred manner. The forward standard $c$ projects beyond the rear standard $g$ to a point approximately beneath the rear end of the seat $o'$.

At the upper end of the shaft $d$ of the steering-rod $e$ are handle-bars $p$, which are formed at their point of union either integrally with said shaft $d$ or secured to the same as an enlargement $p$, in the shape substantially of the letter W, as designated at $p'$, the arms of which are curved forwardly and upwardly considerably in front of the saddle $o'$, as clearly illustrated in Figs. 1 and 2, from the rear thereof and slightly above or nearly on a line therewith, as shown in Fig. 3, and with such a curve or sweep given thereto as to not only clear the rider's legs, but also to partly encircle the thighs of the rider. By such construction of handle-bars in a vehicle of our invention extending some distance in rear of the saddle $o'$ and in advance of the same enables use of the vehicle by either sex and at the same time greater safety in use is afforded, first, because no obstructions are presented in advance of the position of the rider in the vehicle, and, second, the vehicle can be readily mounted and the person when seated thereon has perfect freedom and use of his or her limbs for manipulating the pedaling mechanism as well as absolute control of the steering or pilot wheel through the ease with which the same can be effected by means of said handle-bars or arms $p^2$ and $p^3$ of the machine.

Having thus described the nature and objects of our invention, what we claim as new, and desire to secure by Letters Patent, is—

1. In a bicycle, a frame consisting of a single standard or upright inclined forward and supporting a seat, steering-handles and a steering-wheel, a rear standard extending at approximately right angles to said frame and forked to receive the rear wheel, and horizontal side standards connecting the forks of the rear standard with the lower end of the inclined standard above the front wheel, substantially as and for the purposes described.

2. In a bicycle-frame an inclined front standard, a seat-support secured to and projecting vertically upward therefrom, a steering-rod supported within said standards and projecting backward beyond the seat-support and beneath the rear of the seat, and handles secured to said steering-rod, extending entirely below the seat and terminating in front thereof, substantially as and for the purposes described.

In testimony whereof we have hereunto set our signatures in the presence of two subscribing witnesses.

ALEXANDER H. MACKINNON.
STUART M. GAGE.

Witnesses:
A. V. BELL,
G. E. DE STEIGUER.